Nov. 26, 1957 M. VANZO ET AL 2,814,330
MACHINE FOR BUILDING PNEUMATIC TIRES
Filed Nov. 10, 1953 5 Sheets-Sheet 1

INVENTORS
MARCELLO VANZO,
DARIO GILETTA &
ULISSE NUARA
ATTORNEYS

Nov. 26, 1957  M. VANZO ET AL  2,814,330
MACHINE FOR BUILDING PNEUMATIC TIRES
Filed Nov. 10, 1953  5 Sheets-Sheet 3

FIG. 6

INVENTORS
MARCELLO VANZO,
DARIO GILETTA &
ULISSE NUARA
BY Stevens, Davis, Miller and Mosher
ATTORNEYS

FIG. 7

United States Patent Office 2,814,330
Patented Nov. 26, 1957

2,814,330

MACHINE FOR BUILDING PNEUMATIC TIRES

Marcello Vanzo, Dario Giletta, and Ulisse Nuara, Milan, Italy, assignors to Pirelli, S. p. A., Milan, Italy Application November 10, 1953, Serial No. 391,364

31 Claims. (Cl. 154—9)

The present invention relates to new and useful improvements in machines for building pneumatic tires. The machine shown and described herein is not limited to the building of any particular type of tire as it has certain features which may be beneficial in the building of the standard type of pneumatic tire. However, it is especially adapted and intended for building tires constructed as shown and described in the copending application of Luigi Emanueli, Serial No. 274,085, filed February 29, 1952, to which application reference may be made.

In order to make clear many of the important advantages of the machine of the present application, the novel and distinctive features of the tire shown in the said application should be understood. The tire of the aforesaid application is characterized by a carcass or body composed of rubberized plies of radially arranged cords and by a breaker located between the carcass and the tread, the breaker being composed of at least one band having at least two superposed plies of cords which are substantially inextensible. For this purpose the breaker strip or belt is constructed of parallel strands either textile or wire cords or cables, of very low elongation and arranged parallel to one another in the respective layers at zero inclination or at a small angle only, not exceeding 20° to a plane pependicular to the rotational axis of the tire.

This breaker structure is held under tension and because of its construction and because it operates as a stricture band, the tread portion of the tire has a substantially flat, ground-contacting area. Due to the new construction described, the tread portion of the tire is maintained in a substantially flat condition, and the contraction and expansion of the area of the tread in contact with the ground is greatly minimized. These features of the tire result in substantially reduced tread wear, less consumption of fuel and other advantages more fully set forth in the aforesaid application.

It will be understood, however, that the breaker belt or stricture band is not completely inextensible when built into the tire, for a limited extensibility is desirable due to the necessity of allowing for a limited expansion of the tire in the mold or press during the curing operation that will remove any waviness in the cords of the carcass and give a satisfactory molding operation.

The accepted and standard method of building tires is the so-called "flat band" or "drum building" method in which the plies of rubberized cord fabric constituting the carcass are laid over a flat drum-like structure, the edges of the plies being wrapped in various methods about the beads, which are located in bead seats on the edges of the drum. The tread is now applied to the central portion of the carcass and, as is the common practice, the usual breaker strips or strip, which lie between the tread and the carcass, are applied at the same time. Sidewalls, chafer strips and other parts of the tire are then added. The drum is collapsed and the tire in "flat band" or "pulley band" form is removed and shaped and cured.

This operation is done by bringing the band into substantially tire form and then inserting a curing bag on which the tire is cured in a mold while held under internal pressure or the band is placed in a press in which it is shaped and cured under internal pressure contained in a diaphragm located in the press.

This flat building method is universally adopted and used because it is economical, the building of a tire requires no particular skill or aptitude, and the standard tires perform well, although they do not have the special attributes of a tire made in accordance with the aforesaid application.

In building of the tires of the aforesaid application it is desirable to utilize many of the beneficial and standardized features of the "flat band" method, but due to the special construction and properties of the breaker belt, which inhibit any substantial expansion of the central part of the carcass, it is impossible to employ existing machines and existing methods.

Applicants have devised the machine shown and described herein in order to meet satisfactorily the requirements which are necessary in order to manufacture in a commercially practical and satisfactory manner tires of the new construction. Special mechanism is necessary in order to build the tire accurately and to insure that the finished tire follows the specifications by which the benefits and advantages of the new tire are realized to the fullest extent.

In meeting the problems presented by the new tire the present applicants also created a new and useful method of tire building which is the subject of application Serial No. 579,507, filed April 20, 1956, which is a division and continuation in part of this application.

It will be appreciated that while the machine shown and described herein is particularly and especially adapted for building the new type of tire described herein, it may be used advantageously in the manufacture of standard tires, and the invention is not limited to the field of building tires of the aforesaid Emanueli application.

In the description and the accompanying drawings there is shown several steps in the process such as is necessary for a complete understanding of the invention of this application. There are also illustrated and described the best known and preferred construction and design of the tire building machine, it being understood, however, that the description and drawings are for the purpose of making the invention clear to those skilled in the art, and that the invention is not restricted thereto but is subject to modification and improvement without departure from the basic principles thereof.

In the drawings, Figs. 1 to 5, inclusive, illustrate several steps in the process.

Following the operations shown in the preceding figures, the uncured tire is removed in the manner to be described hereinafter.

Figs. 6 to 10, inclusive, show the details of the machine.

The building of the tire

Figure 1:
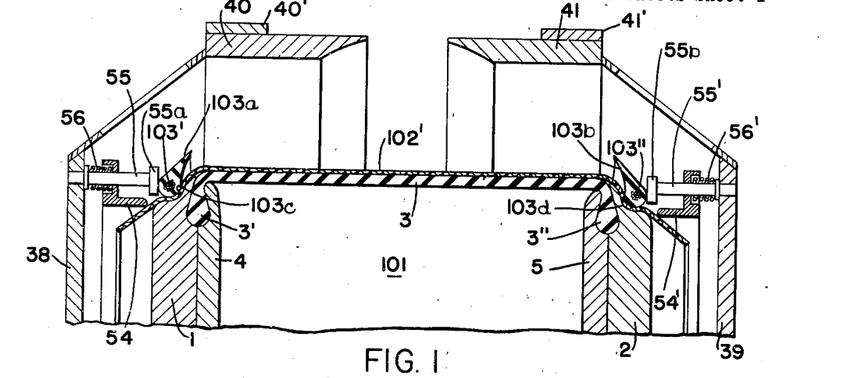
Fig. 1 shows the first or underbead plies of the carcass laid on the drum or building forms, and the application of the bead cores.
Figure 2:
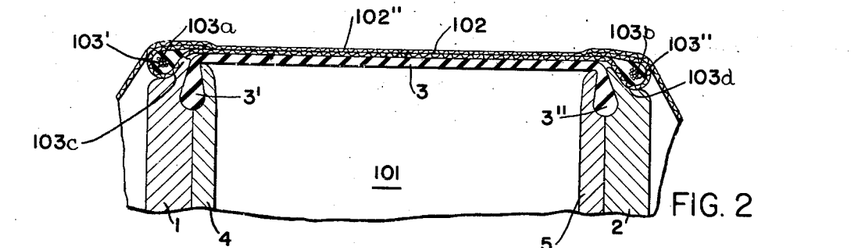
Fig. 2 shows the application of the outer or overbead plies after the first plies have been wrapped about the beads.

Referring first to such details of the tire building process as are necessary for a complete understanding of the invention, the numeral 102 represents the tire carcass as a whole. This is composed of the first or band ply or plies which are given the numeral 102′ and the outer or over bead ply or plies which are given the numeral 102″. The plies 102′ are laid on the building form which is rotated for the purpose, and the edges of these plies are shaped onto the bead seats 103c and 103d. The outer bead 103a and the inner bead 103b, which contain the inextensible bead wires or cables 103′ and 103″, are then set in place on the bead seats as shown in Fig. 1, and the edges of the plies 102′ are turned over the beads as shown in Fig. 2. The outer ply or plies 102″ are then laid over the plies 102′ and the edges trimmed off or later wrapped about the beads to complete the tie-in of the beads.

The central portion of the building form, which is preferably a heavy rubber sheet or diaphragm 3, is now expanded by fluid pressure and at the same time the beaded edges of the carcass are brought together simultaneously and at equal speeds, which causes the carcass to assume the toroidal or tire shape.

The extent of expansion of the carcass is definitely limited to an exact predetermined degree by the two side rings 40 and 41 which are brought into position by mechanism to be described, so that they move toward one another from opposite sides of the building form while the building form is expanding, and to the exact extent previously determined. It will be noted that the outside circumference of the rings 40 and 41 is tangent to the tire carcass so that the tread portion of the tire, which will include the breaker belt, is laid with its inner circumference of the exact dimension required to allow for such limited expansion as is to be given to the tire during vulcanization.

Figure 3:
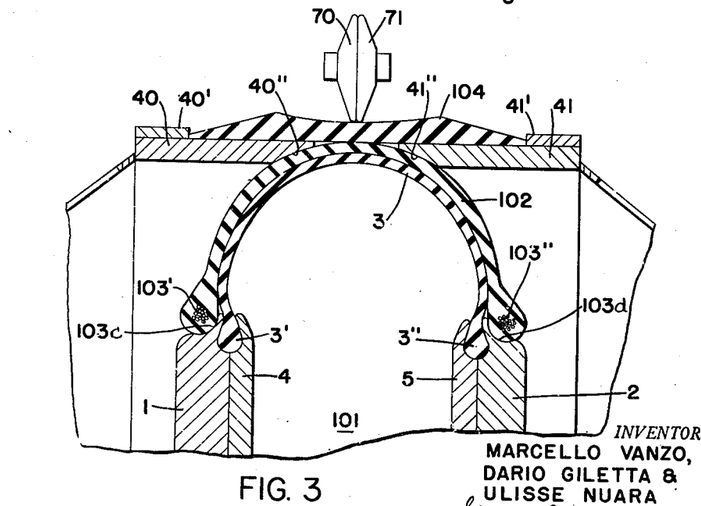
Fig. 3 shows the expansion of the carcass to the circumference at which it receives the tread of the tire and the breaker strip. In this view the circumferential rings which determine the degree of expansion of the carcass are shown in position.

The tread 104 is now applied by wrapping about the rings 40 and 41 and is accurately centered by the guides 40′ and 41′. As shown in Fig. 3 the tread is applied to the narrow exposed area of the carcass between the rings 40 and 41 to which it is adhered by the stitching rollers 70 and 71. If the stricture belt or inextensible breaker 105 is to be a separate part from the tread 104, it may be applied first, followed by the application of the tread 104, or it may be preassembled with the tread and the parts 104 and 105 applied at one operation. If breaker strip 105 is of substantial thickness, fillets 105′ may be added at the edges of the breaker strip.

Figures 4, 5, 11:
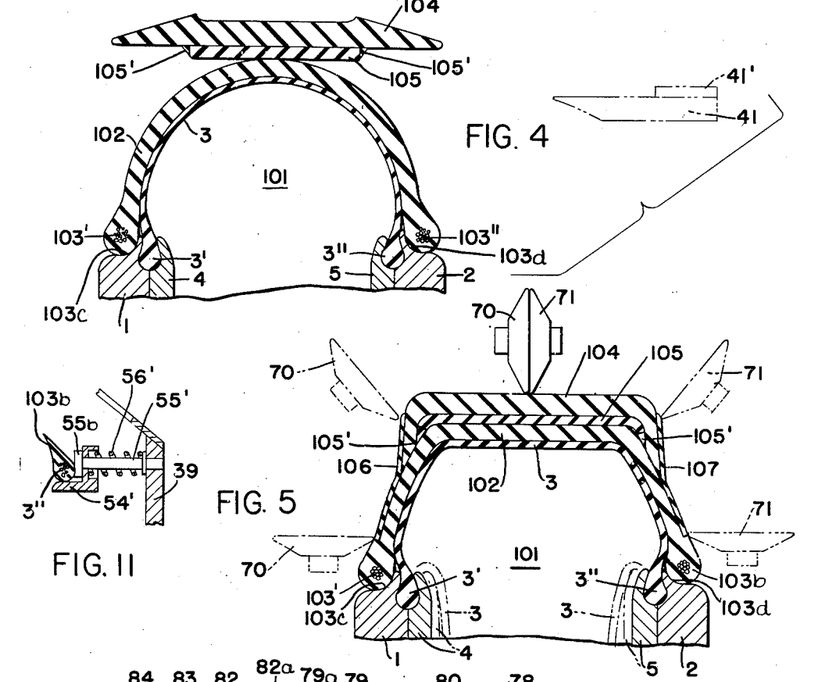
Fig. 4 shows a tread with the inextensible breaker strip on the tire and with the rings removed to the positions shown in dotted lines.
Fig. 5 shows the stitching of the tread and breaker to the carcass and also shows the application of side walls which may be added to the tread strip or may be put in place separately.
Fig. 11 is a detail of the bead setting mechanism.

After the tread portions of the tire, including the breaker belt or strips are adhered at the center line of the carcass, the rings 40 and 41 are withdrawn, as shown by the dotted lines of Fig. 4. The restraining effect of the rings now being released, the pressure within the building form may cause the central area of the carcass to expand slightly but, due to the presence of the stricture band 105, the central portion of the tire will be cylindrical or flat in cross section, as shown in Fig. 5. The tread and breaker are now stitched in place against the carcass by the rollers 70 and 71, which are advanced by mechanism to be described and as shown in dotted lines in Fig. 5.

The building of the tire is now completed and the tire is ready for removal and for any finishing operation, and for vulcanization in any well-known manner. To remove the uncured tire, the two discs 1 and 2 are moved inwardly slightly and the diaphragm 3 may be evacuated, which causes the discs to assume the position shown in dotted lines in Fig. 5, whereupon the inner bead of the tire may be shifted into the depressed area caused by the evacuation of the diaphragm 3 and the tire distorted into oval or elliptical shape, so that the inner edge of the tire may be passed over the outer disc 1.

The tire building machine

The tire building machine comprises a rotatable building form or drum, the working surface of which is the cylindrical sleeve or diaphragm 3, the edges of which are provided with enlarged ribs or beads 3′ and 3″. The sleeve is made of an extensible material, preferably rubber, and is held at its outboard edge by a disc 1 and at its inboard edge by a disc 2. Clamping rings 4 and 5 are secured to the discs 1 and 2, respectively, and grip the edges of the sleeve. The outer edges of the discs 1 and 2 are provided with the bead seats 103c and 103d, respectively.

Figure 6:
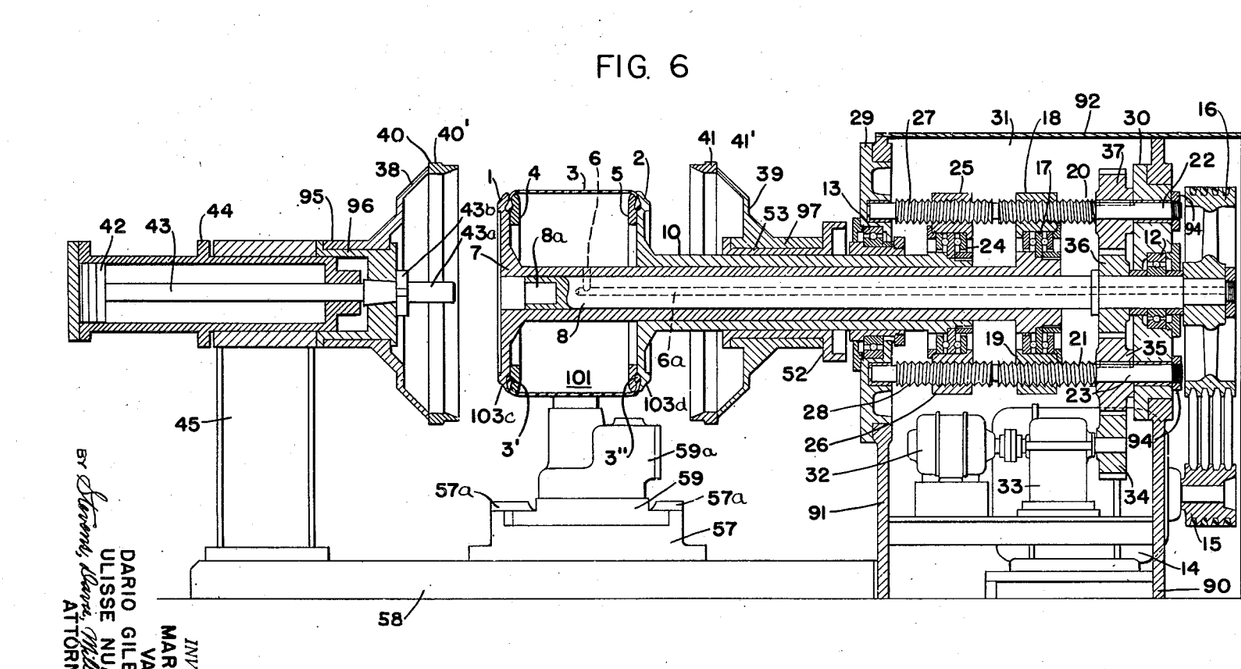
Fig. 6 is a vertical section taken through the machine along the main or central shaft.
Figure 7:
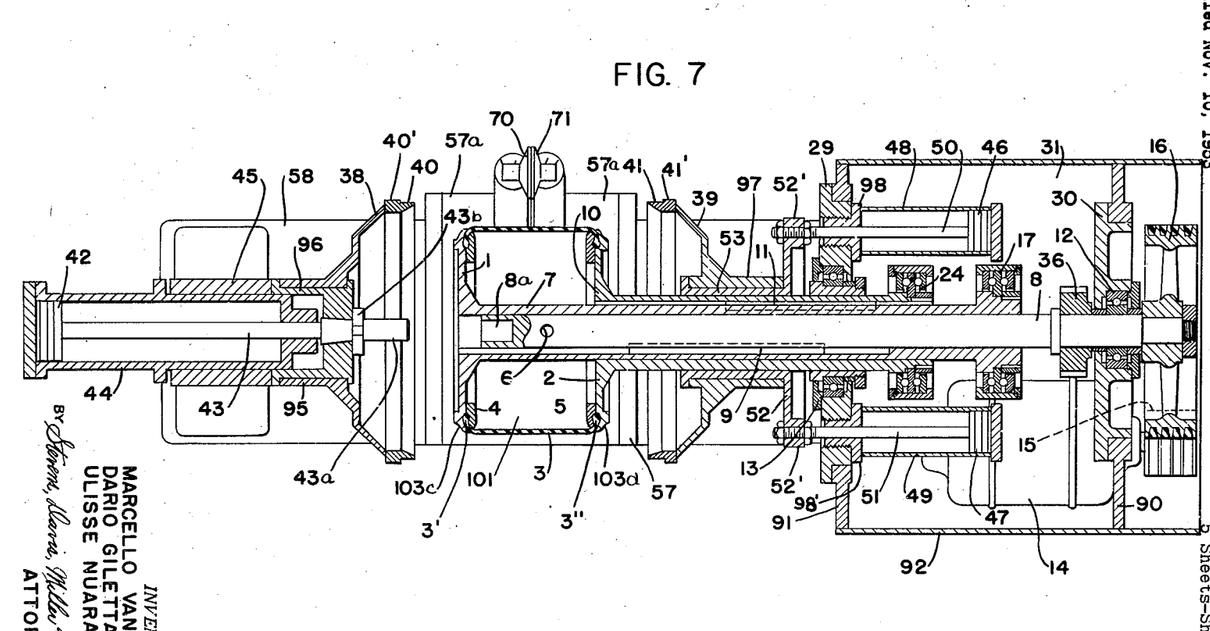
Fig. 7 is a horizontal section through the main shaft looking downwardly.

When the discs 1 and 2 are spread apart for the building operation, as shown in Figs. 6 and 7, the sleeve 3 is taut but a light, superatmospheric pressure may be admitted to the space 101 bounded by the sleeve and the side discs to maintain the working surface sufficiently rigid for the application of the plies. For the shaping of the carcass, the pressure within the sleeve will be increased and the sleeve will assume the toroidal shape of Figs. 3 and 4.

The outboard disc 1 is rigidly connected to the outer end of a long cylindrical mandrel or sleeve 7, which is slidable on the projecting end of a main or central shaft 8, to which it is keyed for joint rotation by the long key 9. The disc 2 is rigidly connected to the other end of a long mandrel or sleeve 10 which surrounds and is slidable upon the sleeve 7, and is restrained from rotation thereon by the long key 11. The shaft 8 is provided with an axial passage or bore 6a terminating in an outlet 6 leading to the interior of the chamber 101 and through which air under pressure is admitted to or exhausted from the chamber for expanding or collapsing the sleeve 3. The pressure of the air within the chamber is controlled through suitable valving in conduits connected to the free end of the bore 6a (not shown).

The shaft 8 and the two sleeves 7 and 10 which are carried thereby are cantilever supported by a housing 31 comprising an inner vertical wall 90 and an outer vertical wall 91, between which is housed the driving mechanism for the machine, as will be described. The housing 31 is surrounded by a cover 92. The inner end of the shaft 8 protrudes beyond the inner end of the sleeve 7 and is mounted in a bearing 12 which is held in a bearing plate 30 set in the inner wall 90. The inner end of the sleeve 10 projects into the housing for a short distance and is supported in a bearing 13 in a bearing plate 29 set in the outer housing wall 91. The shaft 8 is rotated in either direction, at the will of the operator, by a reversible, variable speed motor 14, the shaft of which carries a pulley 15 connected by belting to a larger pulley 16 on the extreme inner end of the shaft 8. The shaft 8 during rotation propels the sleeves 7 and 10 so that the drum is rotated under the control of the workman while he is laying the plies over the drum in the usual manner.

The inner end of the intermediate sleeve 7 terminates in the housing, where it is connected to a thrust bearing 17 carried by a plate which is provided with two threaded sleeves 18 and 19 above and below the central shaft 8. The sleeves 18 and 19 act as nuts engaging screw threaded sleeves 20 and 21 on upper and lower shafts 22 and 23, respectively. The shafts 22 and 23 extend across the housing parallel to the central shaft, the inner end of each shaft being rotatable in a bearing in the plate 29 and the outer end passing through a bearing in the plate 30. The shafts 22 and 23 are removable through the plate 30, being held in position by nuts 94.

The inner end of the sleeve 10 is connected to a thrust bearing 24 carried by a plate which is provided with two threaded sleeves 25 and 26 above and below the central shaft. These sleeves also act as nuts engaging the screw-threaded sleeves 27 and 28 of the shafts 22 and 23. The sleeves 20 and 21 are threaded in the opposite direction to the threads on the sleeves 27 and 28 so that when the shafts 22 and 23 are rotated in the same direction the two discs 1 and 2 will move at equal speeds toward or away from one another, depending upon the direction of rotation of the shafts.

The shafts 22 and 23 are rotated by a reversible motor 32 mounted in the lower part of the housing, which, through speed reduction and control unit 33, drives the spur gear 34 which is in mesh with gear 35 keyed to the shaft 23. Rotation is transmitted to the shaft 22 through idler gear 36 rotatable on the main shaft 8 and meshing with a gear 37 fixed to the shaft 22. It is desirable to regulate the speed at which the discs approach so that the rate at which the discs are brought together is kept in step with the inflation and resultant deformation of the diaphragm, so that the two operations are performed at comparable speeds.

The mechanism will now be described which operates the rings 40 and 41 which limit the expansion of the carcass and constitute the foundation on which the tread portion of the tire is laid. The outboard ring 40 is secured to the rim of a bell-like hood 38 and the inboard ring 41 is secured to the rim of a similar hood 39. The hood 38 is provided with a hub 95 which is rotatably mounted between flanges on a bearing sleeve 96 which is supported on the end of a piston rod 43, on which it is held by a collar 43b. The piston 42 is double-acting and is located in the cylinder 44 mounted in the upper end of a stanchion 45 carried on the outer end of a base plate 58 which extends beneath the drum to the housing 31. The inner end of the piston rod 43 is extended as shown at 43a and when the hood 38 and ring 40 are advanced toward the building form, as will be described, the extension 43a enters a socket 8a in the outer end of the central shaft 8. This centers and steadies the hood 38 as it rotates with the building form.

The hood 39 carrying the ring 41 is likewise provided with a hub 97 which is rotatable between the flanges of a sleeve 53 slidable on the sleeve 10 which carries the inboard ring 41. The inner flange 52 on the sleeve 53 is provided with two diametrically opposed extensions 52' which are affixed to the outer ends of piston rods 50 and 51 movable by pistons 46 and 47 operable in cylinders 48 and 49, which are secured to glands 98 and 98' threaded into the plate 29. The cylinders 48 and 49 are located in the housing at opposite sides of the central shaft, as shown in Fig. 7.

It will be seen that when the piston 42 at the outboard side of the building form and the pistons 46 and 47 at the inboard side of the form are retracted, ample room is provided for the workman when applying the tire fabric and beads to the tire building form.

When the building of the carcass is completed, as shown in Fig. 2, and is ready for shaping, several operations are required and these operations proceed simultaneously, or practically simultaneously:

(1) The motor 32 is started up which, through the gearing described, causes the shafts 22 and 23 to rotate and this, through the rotation of the sleeves in the nuts 18—19 and 25—26, causes the slow approach of the two discs 1 and 2 carrying the beads 103a and 103b with them.

(2) While the discs are approaching, air under pressure is admitted to the chamber 101 which causes the sleeve 3 to expand outwardly concurrently with the narrowing of the space between the beads, and the carcass is thus brought to substantially its final shape. The joint approach of the beads and the expansion of the carcass insures a perfect shaping of the carcass.

(3) It is essential to limit the expansion of the carcass to an exact outer diameter so that the breaker belt and the tread are of exact circumferential extent when they are applied to the carcass. This is a matter of particular importance in building a tire of the Emanueli construction because the breaker has a very limited capacity for stretch and it is desirable to limit the expansion of the carcass at this point in the building operation.

The machine, therefore, provides for the concurrent approach of the two rings 40 and 41 which will close around the carcass as it is expanding and thus arrest any further outward expansion of the carcass. The approach of the rings is arrested while there is a narrow gap between them through which a narrow central circumferential band of the carcass at the crown of the carcass is exposed, sufficient to permit the attachment of the inner surface of the breaker belt, or the tread, to the carcass. As shown more particularly in Figs. 1 and 3, the inner edges of the rings 40 and 41 are provided with concave surfaces 40'' and 41'' which come to relatively thin edges so that the curvature of the carcass is preserved up to the narrow gap through which the tread elements of the tire are attached to the carcass.

The rings 40 and 41 are caused to approach concurrently with the shaping of the tire by the simultaneous admission of pressure to the cylinders 44, 48 and 49. It will be noted that during the subsequent application of the breaker and tread, the hoods 38 and 39 and the rings 40 and 41 will rotate with the tire about the bearing sleeves 96 and 53.

While the carcass is held against the inner surfaces of the rings 40 and 41, the workman will wrap the breaker and the tread about the outer surface of the rings so that the inner surface of the breaker is in contact with the exposed area of the carcass. In the building of a tire in which a breaker is omitted, the tread will be applied directly to the carcass as shown in Fig. 3. The workman may roll the tread elements, including the breaker, to the exposed area of the carcass by hand or he may use the mechanical stitchers 70 and 71, the construction and operation of which will be described. During these operations the drum and the rings 40 and 41 will be rotated through the main shaft 8.

The workman now reverses the cylinders 44, 48 and 49 and the hoods 38 and 39 return to idle position, leaving the partially finished tire free for the subsequent operations.

These operations consist in rolling the tread and breaker, and any sidewalls or the like, into close adhesion with the carcass, which is done by the stitching rollers 70 and 71 as they separate and advance over the tire as shown by the dotted line positions in Fig. 5.

The building operations being completed, the interior of the chamber is now evacuated and the tire is removed as heretofore described. The motor 32 is now reversed and the discs 1 and 2 are separated to restore the drum to its working condition, during which time air is readmitted to the chamber 101 to give the necessary rigidity to the diaphragm 3.

The stitching rollers

On the base 58, at the side of the drum opposite to the workman, is located a bench 57 having on its upper surface guideways 57a in which a carriage 59 is movable toward and from the building form in order to be properly adjusted for different sizes of building forms. The adjustment is through a threaded shaft 60 rotatable in one end of the bench and engaging a nut 61 attached to the underside of the carriage 59.

Figure 8:
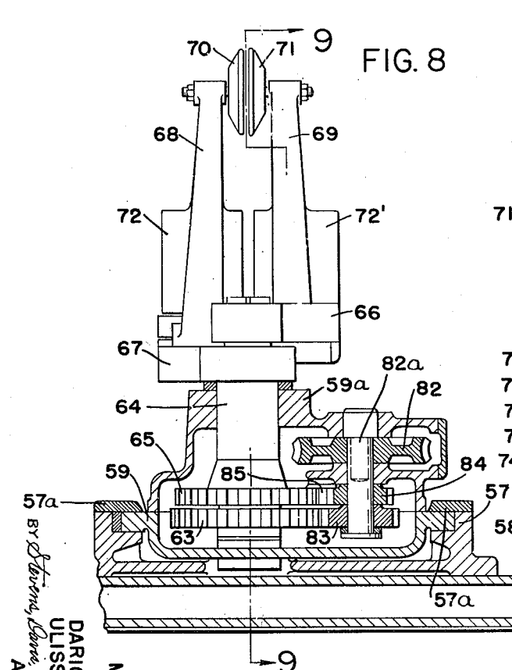
Fig. 8 is a partial vertical elevation and partial vertical section of the spinning rollers and their drive mechanism.

At the other end of and rotatable in the carriage 59 and a housing 59a attached thereto, is a vertical shaft 62, to the lower end of which is attached a gear 63. Rotatably mounted on the shaft 62 is a sleeve 64, on the lower end of which is formed a second gear 65 overlying the gear 63. To the extreme upper end of the shaft 62 is affixed an arm 66, in the outer end of which is a shaft 66a. Attached to the upper end of sleeve 64 is a similar arm 67. The two arms 66 and 67 extend to opposite sides of the center line of the shaft 62 as shown in Fig. 8.

Pivoted on shaft 66a is an arm 69 which carries the stitching roller 71, and pivoted on arm 67 is an arm 68 which carries the stitching roller 70. As will be seen from the further description, the arms 68 and 69 are spread apart during the stitching operation by rocking them in opposite directions. As the arm 68 with stitching roller 70 and arm 69 with stitching roller 71 are identical, only one will be described, namely the arm 69. It will be noted that the shaft 62 and sleeve 64 should be located at the center of curvature of the carcass and this may be brought about for any variation in tire size by the adjustment of the carriage through screw 60.

Figure 9:
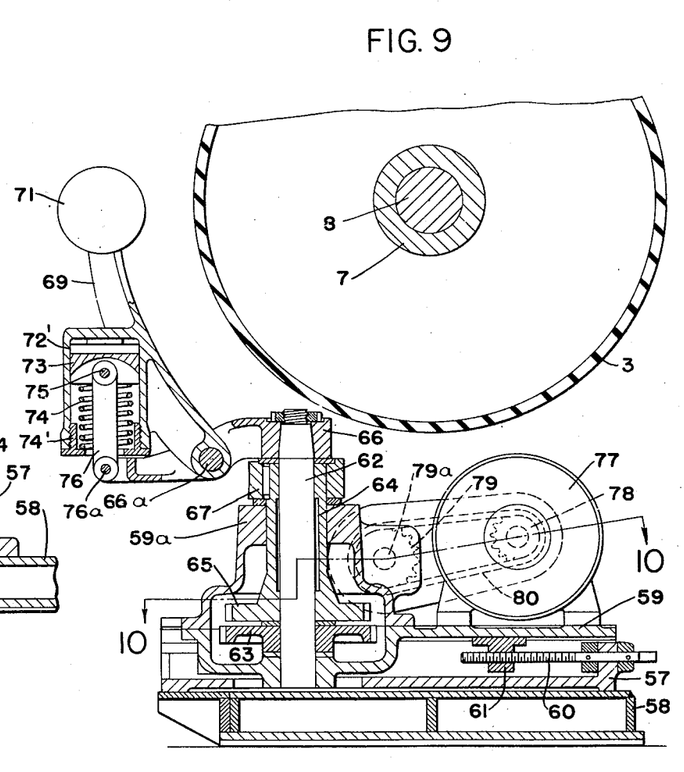
Fig. 9 is a vertical section on the line 9—9 of Fig. 8.

The arm 69 is pivoted at its lower end on the shaft 66a in the end of the arm 66, and at its upper end is journaled the stitching roller 71. On one side of the arm is located a cylinder 72'. A similar cylinder 72 is located on the arm 68. In the cylinder 72' is a piston 73 which is moved relatively to the cylinder by fluid pressure admitted to the upper end thereof and acting against a spring 74 held in the lower end of the cylinder by a cap 74' (Fig. 9). Pivoted on pin 75, on the underside of the piston, is a link 76, the lower end of which is pivoted at 76a to the end of the arm 66. It will be seen that when pressure is admitted to the cylinders 72 and 72' the arms 68 and 69 are rocked inwardly toward the tire building drum and the stitching rollers 70 and 71 will be moved and yieldingly held against the surface of the tire during the stitching of the tread and sidewalls, and at the same time the rollers will be spread apart so that they follow the path shown in Fig. 5.

Figure 10:
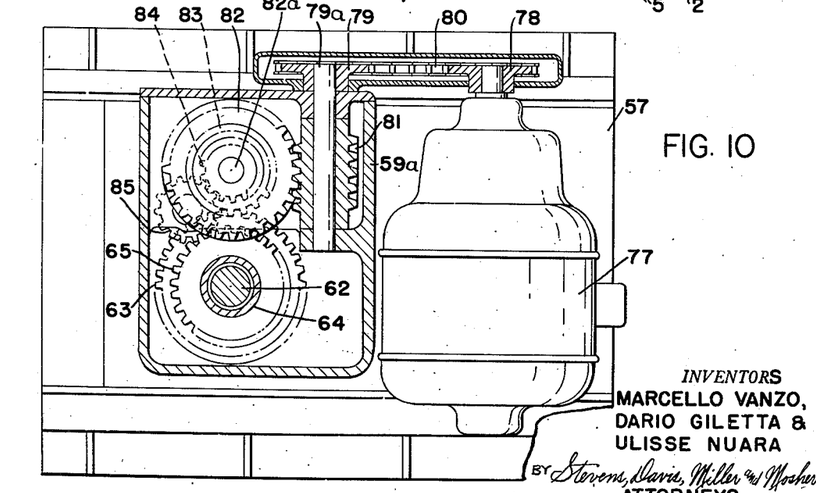
Fig. 10 is a horizontal section on the line 10—10 of Fig. 9.

The spreading of the rollers 70 and 71 and the subsequent return is done by a reversible motor 77 mounted on the carriage 59. Driven by the motor is a sprocket 78 which drives a sprocket 79 through the chain 80. The sprocket 79 is on the end of a horizontal shaft 79a which is rotatable in the housing 59a and carries a worm 81 which drives a worm gear 82 (Fig. 8) on the upper end of a vertical shaft 82a located in the housing at the side of the shaft and sleeve 62—64. On the lower end of the shaft is gear 83 which is in direct mesh with the gear 63 on the shaft 62. Above gear 83 is a second gear 84 which meshes with an idler gear 85 which in turn meshes with the gear 65 on the sleeve 64 (Fig. 10). In this manner the two arms 66 and 67 carrying their respective rollers are moved away from each other for the stitching operation while they are pressed against the outer surface of the tire. At the conclusion of the stitching operation pressure is released from the cylinders 72 and 72', the arms 68 and 69 move away from the tire by the springs 74 and the arms 66 and 67 are returned to their idle position (Fig. 7) by the reversal of the motor 77.

Bead setting mechanism

It is desirable to provide a setting mechanism which will accurately position the beads 103a and 103b on the respective bead seats 103c and 103d. After the inner plies 102' are laid about the drum and shaped into the bead seats, usually by a hand roller, the inner and outer beads are moved into position and firmly seated by the mechanism to be described, and for this purpose the hoods 38 and 39 may be utilized as a part of a bead setting mechanism.

On the inside of the hood 38 opposite the bead seat 103c are located a plurality of pins or stud bolts 55, and on the stud bolts is slidably mounted a flanged ring 54, the flange of which is directed toward the form. Springs 56 urge the ring outwardly. On the inside of the hood 39 similar pins or stud bolts 55', ring 54' and springs 56' are located opposite the bead seat 103d.

When the hoods 38 and 39 are withdrawn, the springs 56 and 56' will force the rings 54 and 54' outwardly until they strike the heads 55a and 55b of the studs 55 and 55', as shown for example in Fig. 11. The flanges of the rings 54 and 54' form shelves on which the beads may be placed.

As the preliminary step in the building operations and while the diaphragm 3 is collapsed as shown in dotted lines in Fig. 5, the inside bead 103b is passed over the building form and seated on the flange of the ring 54', as shown in Fig. 11. The outside bead 103a is likewise seated on the flange of the ring 54.

When the underbead plies 102' are laid over the form and shaped down over the edges and into the bead seats 103c and 103d, pressure is admitted behind the pistons 42, 46 and 47 which moves the hoods inwardly. As the hoods approach their inmost position, the edges of the rings 54 and 54' strike the discs 1 and 2, respectively. Continued inward movement of the hoods moves the rings backwardly against the force of the springs 56 and 56', which causes the pins 55 and 55' to force the beads off the rings 54 and 54' and onto their respective bead seats on the building form, as will be seen by comparing Figs. 5 and 11. This operation sets the beads accurately and firmly in position. The hoods 38 and 39 are then retracted and the building operation is proceeded with.

The bead setting mechanism has been omitted from Figs. 6 and 7 for clearness and also to indicate that while this is a useful feature of the machine, it may be omitted and the beads set by hand, if desired.

Résumé

It is believed that the operation will have been made clear by the foregoing and only a brief summary of the steps will follow.

(a) The machine being in the condition shown in Figs. 6 and 7 and with the beads in place on the rings 54 and 54', the under bead plies are applied to the drum and shaped into the bead seats. (b) The beads are now applied, preferably by the use of the bead setting mechanism shown in Figs. 5 and 11. (c) The over bead plies are now laid over the drum and rolled into place, which completes the carcass. (d) The carcass is now shaped by the concurrent approach of the discs 1 and 2, and the inflation of the diaphragm 3 and the approach of the rings 40 and 41, which determine the expansion of the carcass to receive the tread elements. (e) The tread elements, i. e., the breaker belt and the tread, and, if desired, the side walls, are now applied to the exposed central area of the carcass and rolled in place, the rings 40 and 41 furnishing the base about which the tread elements are laid during this operation. (f) The rings 40 and 41 are withdrawn and the tire is ready for the stitching of the tread. (g) Pressure is admitted to the cylinders 72 and 72' and the rollers 70 and 71 are advanced into contact with the tire being held by yielding pressure while the motor 77 is started up and the rollers progress over the tire, stitching the tread elements and the side wall to the tire. When the rollers reach the outer limit of their movement, valve mechanism (not shown) is operated to release the pressure on the cylinders 72 and 72' and the rollers 70 and 71 are withdrawn from the tire. At the same time the motor 77 is reversed and the rollers return to their original position. (h) The discs 1 and 2 are moved toward each other by the motor 32, chamber 101 is evacuated and the finished tire removed.

The various steps which are susceptible of automatic control may be actuated through any suitable timing mechanism, several of which are available.

It will be seen that there has been created a machine which is especially efficient and effective for the building of the specially constructed tire of the aforesaid Emanueli application, but that it is not necessarily confined to the building of that tire as it may be used in the construction of standard types of tires. In any case the shaping of the carcass is more accurately controlled so that the tires are more nearly standardized than with earlier forms of tire building machinery.

What we claim is:

1. Apparatus for building and shaping pneumatic tires comprising a frame, a shaft cantilever supported by said frame, a building drum carried by the free end of said shaft for rotation therewith, means to rotate said shaft, said drum including two spaced end discs and a resilient deformable sheet defining the surface of said drum fixed to said end discs, means for relatively moving said discs toward each other and apart, and means for inflating said drum when said discs are moved toward each other to cause said resilient sheet to deform into toric shape.

2. Apparatus as defined in claim 1 including a pair of rings mounted at opposite ends of said drum for axial movement relative to said drum and characterized by an inner profile complementary to the profile of said resilient sheet when deformed in toric shape, and means for moving said rings relative to said drum along the axis of rotation of said drum.

3. Apparatus as defined in claim 2 wherein means are provided for stopping said rings in predetermined relationship with the outer surface of said drum.

4. Apparatus as defined in claim 2 wherein said rings are characterized by an outer profile of at least one step, said step constituting in effect a guiding means for a tread element to be applied to the carcass.

5. Apparatus as defined in claim 2 wherein bead ring positioning means are mounted on said rings for movement with said rings.

6. Apparatus as defined in claim 1 wherein stitching means are provided to cooperate with said drum in the application of a tread to a carcass shaped by said resilient sheet when deformed into toric shape.

7. Apparatus as defined in claim 1 wherein a stitching apparatus is provided which includes two arms carrying stitching discs, said arms being pivoted on a common axis, means for rotating said arms in opposite directions relative to one another about said common axis, and means for moving said arms transversely of said drum axis.

8. An apparatus for building and shaping pneumatic tires as defined in claim 1 wherein means is provided for evacuating the drum to cause the sheet to be collapsed inwardly.

9. An apparatus for building and shaping pneumatic tires as defined in claim 1 wherein means is provided for concurrently evacuating the drum and moving the discs still further toward one another.

10. Apparatus as defined in claim 2 wherein each said ring is provided with a guide for a tread element, said guides being located symmetrically with respect to the opposed edges of said rings.

11. A machine for building pneumatic tires comprising a pair of discs forming the end plates of a rotatable tire building form, an expansible cylindrical diaphragm connected at its edges to the discs, bead seats at the edges of the drum, means to inflate the diaphragm, and means to move the discs toward one another while the diaphragm is expanding.

12. A machine for building pneumatic tires comprising a pair of discs forming the end plates of a rotatable tire building form, an expansible cylindrical diaphragm connected at its edges to the discs, bead seats at the edges of the drum, means to inflate and evacuate the diaphragm, and means operable while the diaphragm is being inflated to move the discs toward one another.

13. A machine for building pneumatic tires comprising a pair of discs forming the end plates of a rotatable tire building form, an expansible cylindrical diaphragm connected at its edges to the discs, bead seats at the edges of the drum, means to inflate and evacuate the diaphragm, and means operable while the diaphragm is being inflated and deflated to move the discs toward one another.

14. A machine for building pneumatic tires comprising a pair of discs forming the end plates of a rotatable tire building form, an expansible cylindrical diaphragm adapted to receive the plies constituting the carcass of a tire, said diaphragm being connected at its edges to said discs, bead seats on the edges of said discs, means operative concurrently to inflate the diaphragm and to move the discs together to change the carcass from a band to tire form, and means to limit the expansion of the carcass.

15. A machine for building pneumatic tires comprising a pair of discs forming the end plates of a rotatable tire building form, an expansible cylindrical diaphragm adapted to receive the plies constituting the carcass of a tire, said diaphragm being connected at its edges to said discs, bead seats on the edges of said discs, means operative concurrently to inflate the diaphragm and to move the discs together to change the carcass from a band to tire form, and two rings movable over the drum to limit the expansion of the carcass.

16. A machine for building pneumatic tires comprising a pair of discs forming the end plates of a rotatable tire building form, an expansible cylindrical diaphragm adapted to receive the plies constituting the carcass of a tire, said diaphragm being connected at its edges to said discs, bead seats on the edges of said discs, means operative concurrently to inflate the diaphragm and to move the discs together to change the carcass from a band to tire form, two rings the internal surfaces of which determine the extent to which the carcass may expand, and means to move said rings from the sides of the form to positions surrounding the diaphragm while the diaphragm is expanding.

17. A machine for building and shaping pneumatic tires comprising a tire building drum, the building surface of which is constituted by an expansible diaphragm, means to expand the diaphragm to change a tire carcass thereon from band to tire shape, and an annular member to limit the expansion of the carcass to a predetermined extent, said annular member leaving the crown of the tire exposed for attachment of a tread element to the carcass.

18. A machine for building and shaping pneumatic tires comprising a tire building drum, the building surface of which is constituted by an expansible diaphragm, means to expand the diaphragm to change a tire carcass thereon from band to tire shape, two rings movable from the side of the drum to a position around the diaphragm to limit the expansion of the carcass to a predetermined external circumference, and means to arrest the approach of the rings and leave the crown of the carcass exposed to permit the tread elements to be attached to the crown of the carcass between the rings.

19. A machine for building and shaping pneumatic tires comprising a tire building drum, the building surface of which is constituted by an expansible diaphragm, means to expand the diaphragm to change a tire carcass thereon from band to tire shape, and an annular member movable from outside the drum to a position over the central plane of the drum to limit the expansion of the carcass to a predetermined extent.

20. A machine for building and shaping pneumatic tires comprising a tire building drum, the building surface of which is constituted by an expansible diaphragm, means to expand the diaphragm to change a tire carcass thereon from band to tire shape, and an annular member movable from outside the drum to a position over the central plane of the drum to limit the expansion of the carcass to a predetermined extent, said annular member leaving the crown of the carcass exposed for attachment of a tread element to the crown.

21. A tire making machine having a rotatable tire building drum, said drum having an expansible diaphragm constituting the carcass building surface of the drum, two side plates having bead seats on their peripheries, means for moving the plates together and expanding the diaphragm at comparable speeds to change the carcass from band to tire form, and a pair of rings movable toward one another over the diaphragm to limit the expansion of the carcass, and means to arrest the approach of the rings to leave the crown of the carcass exposed between the rings, the periphery of the rings constituting a supporting surface for a tread element.

22. A tire making machine in accordance with claim 21 in which the rings are rotatable with the drum.

23. A tire making machine having a rotatable tire building drum, an expansible diaphragm constituting the building surface of the drum, means to cause the edges of a carcass to approach while the diaphragm is expanded, rings movable over the drum to limit the outward expansion of the carcass, said rings when in their innermost position leaving the crown of the carcass exposed for attachment of a tread element to the crown, a stitching roller to attach the tread element to the carcass, and means to move the roller into contact with the tread element.

24. A machine in accordance with claim 23 in which the rings are rotatable with the drum while the tread element is being attached to the carcass.

25. A tire making machine having a rotatable tire building drum, an expansible diaphragm constituting the building surface of the drum, a conduit for conducting fluid under pressure to the diaphragm, means to cause the edges of the carcass to approach while the diaphragm is expanding, rings movable into position over the drum to limit the outward expansion of the carcass but to leave the crown of the carcass exposed for the attachment of the central zone of a tread, spinning rollers, means to move the spinning rollers against the tread to attach the tread to the crown of the carcass, means to withdraw the rings after the tread is attached, and means to cause the rollers to move around the tire to stitch the tread to the expanded carcass.

26. A machine in accordance with claim 25 in which the spinning rollers are yieldably held in contact with the carcass during the spinning operation.

27. In a flat drum tire building machine, a tire building drum, bead seats on the edges of the drum and a bead setter, said bead setter comprising a support movable laterally toward and away from the drum, a plurality of pins on the inner face of the support, a bead supporting ring on the pins, springs to hold the ring extended, and means to move the support toward the drum until the ring strikes the side of the drum interiorly of the bead seat and the ring is moved along the pins against the force of the springs whereby the ends of the pins shift the bead from the ring to its position on the bead seat.

28. A tire building machine according to claim 27 in which a bead setter is located on each side of the drum and in which the supports for the rings are moved toward the drum simultaneously.

29. A tire building machine according to claim 27 in which a bead setter is located on each side of the drum and in which fluid pressure means is provided to move the supports for the rings toward and from the drum.

30. Apparatus for building and shaping pneumatic tires comprising a frame, a shaft supported by said frame, a building drum carried by the shaft for rotation therewith, means to rotate said shaft, said drum including two spaced end discs and a resilient deformable sheet defining the surface of said drum fixed to said end discs, means for relatively moving said discs toward each other and apart, means for inflating said drum when said discs are moved toward each other to cause the sheet to deform into toric shape, and a stitching apparatus comprising two pivoted arms carrying stitching discs, and means for rotating the arms in opposite directions and for moving the arms transversely of the axis of the drum.

31. A machine for building pneumatic tires comprising a pair of rigid discs forming the end plates of a rotatable tire building form, an expansible cylindrical diaphragm connected at its edges to the discs, bead seats in the outer faces of the discs, said bead seats being of lesser diameter than the outer diameter of the discs, means to inflate and evacuate the diaphragm and means operable when the diaphragm is deflated to move the discs toward each other, whereby after the discs are brought together and the diaphragm deflated, a beaded portion of the tire may be ovalized and moved over one disc, into the area between the discs and then over the other disc to remove the finished tire from the form.

References Cited in the file of this patent

UNITED STATES PATENTS

| | | |
|---|---|---|
| 2,084,009 | Sohl | June 15, 1937 |
| 2,182,176 | Maranville | Dec. 5, 1939 |
| 2,313,035 | Breth | Mar. 9, 1943 |
| 2,464,020 | Breth | Mar. 8, 1949 |
| 2,476,884 | Maynard | July 19, 1949 |
| 2,490,445 | Kuffler | Dec. 6, 1949 |